(12) United States Patent
Niitsuma et al.

(10) Patent No.: US 8,746,604 B2
(45) Date of Patent: Jun. 10, 2014

(54) FISHING REEL

(75) Inventors: Akira Niitsuma, Osaka (JP); Shouji Nakagawa, Osaka (JP); Satoshi Ikebukuro, Osaka (JP); Ken'ichi Kawasaki, Osaka (JP)

(73) Assignee: Shimano Inc., Osaka (JP)

( * ) Notice: Subject to any disclaimer, the term of this patent is extended or adjusted under 35 U.S.C. 154(b) by 103 days.

(21) Appl. No.: 13/368,170

(22) Filed: Feb. 7, 2012

(65) Prior Publication Data

US 2012/0223173 A1 Sep. 6, 2012

(30) Foreign Application Priority Data

Mar. 4, 2011 (JP) .................................. 2011-47114
Jun. 15, 2011 (JP) ................................ 2011-133243

(51) Int. Cl.
*A01K 89/01* (2006.01)

(52) U.S. Cl.
USPC ........................... 242/322; 242/310; 242/317

(58) Field of Classification Search
USPC ......................................... 242/322, 317, 310
See application file for complete search history.

(56) References Cited

U.S. PATENT DOCUMENTS

| | | | | | |
|---|---|---|---|---|---|
| 6,088,947 | A | * | 7/2000 | Suzue et al. | 43/18.1 R |
| 6,467,591 | B2 | * | 10/2002 | Ohara | 188/251 A |
| 7,241,050 | B2 | * | 7/2007 | Uenosono et al. | 384/107 |
| 2001/0020661 | A1 | * | 9/2001 | Ohara | 242/264 |
| 2006/0079863 | A1 | * | 4/2006 | Burgmeier et al. | 606/1 |
| 2010/0243788 | A1 | * | 9/2010 | Oku | 242/525 |
| 2011/0136411 | A1 | * | 6/2011 | Nakanishi et al. | 451/41 |

FOREIGN PATENT DOCUMENTS

| | | | |
|---|---|---|---|
| JP | H05-002679 U | | 1/1993 |
| JP | H11-206287 A | | 8/1999 |
| JP | H11-225633 A | | 8/1999 |
| JP | 2006177527 A | * | 7/2006 |
| JP | 2007-097474 A | | 4/2007 |

* cited by examiner

*Primary Examiner* — Emmanuel M Marcelo
(74) *Attorney, Agent, or Firm* — Global IP Counselors (57) ABSTRACT

A fishing reel for winding and releasing a fishing line includes a tubular spool being configured to wind the fishing line onto an outer periphery thereof, a spool shaft made of metal, the spool shaft being attached to an inner periphery of the spool, and a Diamond Like Carbon (DLC) layer being formed on a surface layer side of the spool shaft.

11 Claims, 10 Drawing Sheets

FISHING REEL

CROSS-REFERENCE TO RELATED APPLICATIONS

This application claims priority to Japanese Patent Application Nos. 2011-047114 filed on Mar. 4, 2011 and 2011-133243 filed on Jun. 15, 2011, the entirety of which is hereby incorporated by reference.

BACKGROUND OF THE INVENTION

1. Field of the Invention

The present invention relates to a fishing reel, particularly to a fishing reel for winding and releasing a fishing line.

2. Background Art

Some fishing reels are configured to wind and release a fishing line while being attached to a fishing rod. Such fishing reels are mainly classified into the spinning reels and the dual-bearing reels. A fishing reel of the both types generally includes a reel unit, a spool shaft, and a spool. The reel unit is attached to the fishing rod. The spool shaft is supported by the reel unit. The spool is attached to the spool shaft for winding the fishing line. More specifically, a dual-bearing reel has a structure in which the spool is rotatably supported by the reel unit, whereas a spinning reel has a structure in which the spool is attached to the reel unit while being movably back and forth. For example, the above structures are described in Japan Registered Utility Model Publication No. JP-U-H05-002679 and Japan Laid-open Patent Application Publication Nos. JP-A-H11-206287 and JP-A-2007-097474.

In the aforementioned fishing reels, the spool is integrally made of either synthetic resin or light metal (e.g., aluminum alloy, magnesium alloy, etc.). The spool shaft is made of, for instance, stainless alloy. The spool shaft is supported by at least a bearing attached to the reel unit. Alternatively, the spool shaft supports a pinion gear and the spool.

Further, it has been widely known that some components for the fishing reels intended to be often used outside. Especially, the components are made of magnesium alloy having a coating made of coating material on the surface thereof. With such coating, the magnesium-alloy components are prevented from being exposed to corrosion atmosphere. Thus, corrosion resistance of the components can be enhanced. However, the magnesium-alloy components can have the following drawbacks when other components made of metal (e.g., stainless alloy) are disposed closer to the magnesium-alloy components. For example, galvanic corrosion can be caused in the magnesium-alloy components when conductive liquid (e.g., salty water) intrudes into an area between the other metal components and the magnesium-alloy components. This is due to localized electric cells to be formed by means of difference in ionization tendency between magnesium alloy and the other metal.

Some structures have been proposed so far for solving the aforementioned drawbacks. In the structures, an aluminum-alloy component is interposed between a stainless-alloy component and a magnesium-alloy component in consideration of the fact that aluminum has similar ionization tendency to magnesium. For example, Japan Laid-open Patent Application Publication No. JP-A-H11-225633 describes one of the well-known structures. In this structure, localized electric cells are prevented from being easily formed between the magnesium-alloy spool and the stainless-alloy spool shaft due to the aluminum-alloy sleeve interposed between the magnesium-alloy spool and the stainless-alloy spool shaft. Therefore, galvanic corrosion can be prevented in the magnesium-alloy spool.

In the aforementioned well-known fishing reels, the outer peripheral surface of the spool shaft and the inner peripheral surface of a bearing or a pinion gear are rotated relatively to each other with a high load or at a high speed. Such relative rotation with a high load or at a high speed can result in burnout between the outer peripheral surface of the spool shaft and the inner peripheral surface of the bearing or the pinion gear. To prevent the burnout, oil or grease is filled between the outer peripheral surface of the spool shaft and the inner peripheral surface of the bearing or the pinion gear. However, oil or grease can flow out due to intrusion of sea water or due to washing by water after use. Therefore, anglers are required to frequently supply oil or grease between the outer peripheral surface of the spool shaft and the inner peripheral surface of the bearing or the pinion gear.

Further, the well-known fishing reel has the structure in which the aluminum-alloy sleeve is interposed between the stainless-alloy spool shaft and the magnesium-alloy spool. Thus, the additional sleeve made of aluminum alloy is required. This increases the number of components. In addition, manufacturing cost can be thereby increased.

Yet further, the well-known fishing reel has the structure in which the spool is supported by the spool shaft through the sleeve. Therefore, a relative positional error is easily produced between the spool and the spool shaft. This can result in run-out of the outer periphery of the spool with respect to the spool shaft.

It is an advantage of the present invention to enhance abrasion resistance of the spool shaft and reduce frictional resistance between the outer peripheral surface of the spool shaft and the inner peripheral surface of the bearing or the pinion gear.

It is another advantage of the present invention to reduce a relative positional error between a spool and a spool shaft in fishing components as much as possible, reduce manufacturing cost, and prevent galvanic corrosion of a component made of magnesium alloy.

SUMMARY

A fishing reel for winding and releasing a fishing line is provided. The fishing reel includes a tubular spool being configured to wind the fishing line onto an outer periphery thereof, a spool shaft made of metal, the spool shaft being attached to an inner periphery of the spool, and a Diamond Like Carbon (DLC) layer being formed on a surface layer side of the spool shaft.

BRIEF DESCRIPTION OF THE DRAWINGS

Referring now to the attached drawings which form a part of this original disclosure.

DETAILED DESCRIPTION OF THE EXEMPLARY EMBODIMENTS

Figure 1:
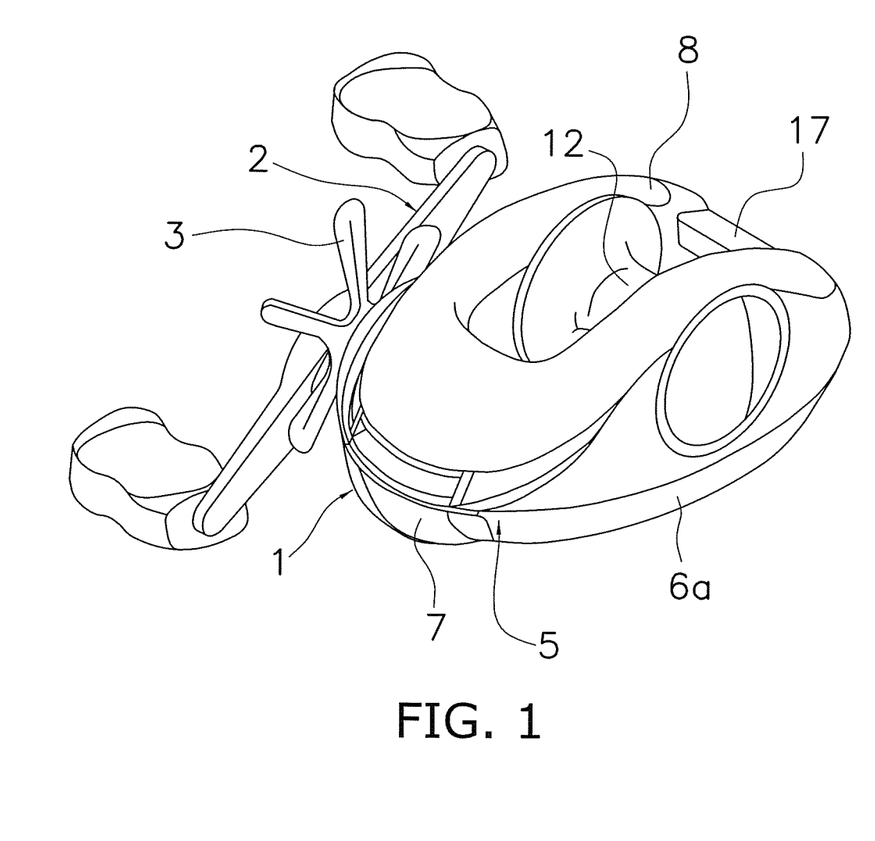
FIG. 1 is a perspective view of a dual-bearing reel adopting an exemplary embodiment of the present invention.

As illustrated in FIG. 1, a fishing reel according to an exemplary embodiment of the present invention is a low profile dual-bearing reel for bait-casting. The dual-bearing reel includes a reel unit 1, a handle 2 for spool rotation, and a star drag 3 for drag regulation. The handle 2 is disposed lateral to the reel unit 1. The star drag 3 is disposed on the reel unit side of the handle 2.

Figure 2:
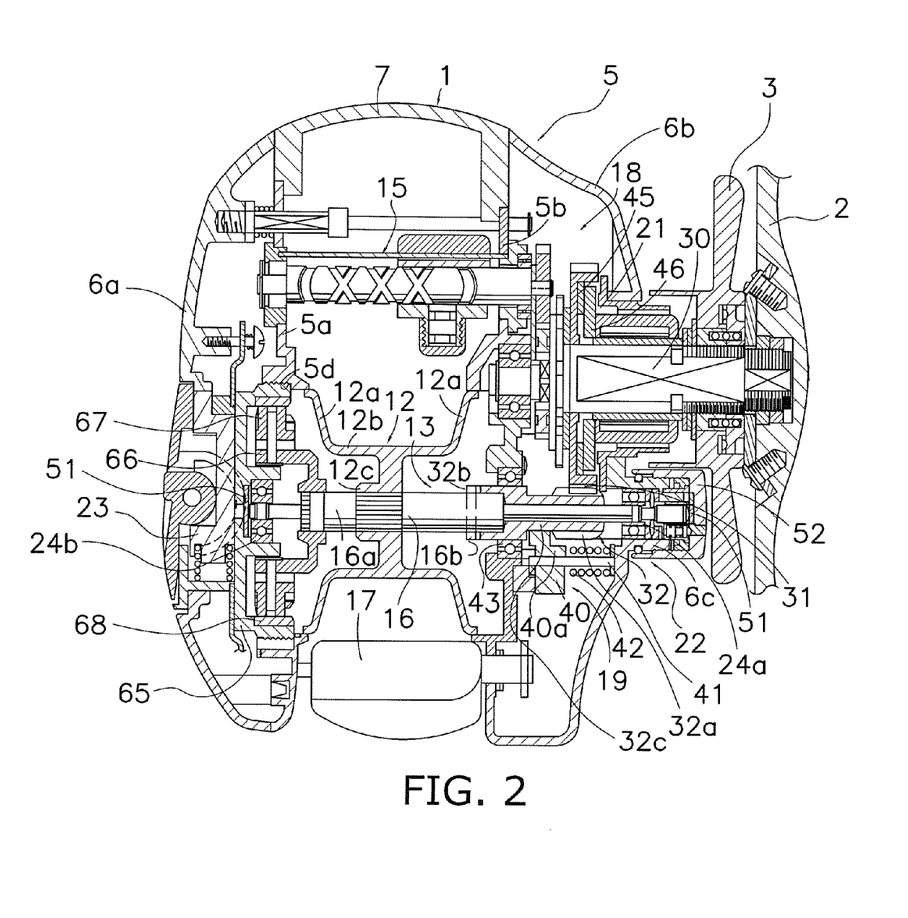
FIG. 2 is a cross-sectional view of the dual-bearing reel.

As illustrated in FIG. 2, the reel unit 1 includes a frame 5 and a pair of first and second side covers 6a and 6b attached to the both lateral sides of the frame 5. As illustrated in FIG. 1, the reel unit 1 further includes a front cover 7 and a thumb rest 8. The front cover 7 covers the front of the reel unit 1, whereas the thumb rest 8 covers the top of the reel unit 1. Further, a spool 12 for winding a fishing line is attached to the inside of the reel unit 1 in a rotatable and detachable state.

The frame 5 includes a pair of first and second side plates 5a and 5b and a plurality of coupling members (not illustrated in the figures). The first and second side plates 5a and 5b are facing each other at a predetermined interval, while being coupled by the coupling members.

As illustrated in FIG. 2, the frame 5 accommodates the spool 12, a level winding mechanism 15, and a clutch lever 17. The spool 12 is disposed in a perpendicular direction to a fishing rod. The level winding mechanism 15 is configured to uniformly wind the fishing line onto the spool 12. The clutch lever 17 functions as a thumb pad in thumbing the fishing line. The spool 12 is allowed to pass through an opening 5d formed in the first side plate 5a. Further, a gear mechanism 18, a clutch mechanism 13, a clutch engaging/disengaging mechanism 19, a drag mechanism 21, and a casting control mechanism 22 are disposed between the frame 5 and the second side cover 6b. The gear mechanism 18 is configured to transfer rotational force of the handle 2 to the spool 12 and the level winding mechanism 15. The clutch engaging/disengaging mechanism 19 is configured to execute engagement/disengagement and control of the clutch mechanism 13 in response to an operation of the clutch lever 17. The casting control mechanism 22 is configured to regulate resistance to be applied during rotation of the spool 12. On the other hand, a centrifugal mechanism 23 is disposed between the frame 5 and the first side cover 6a. The centrifugal mechanism 23 is configured to inhibit backlash from being caused in casting the fishing rod.

Figure 3:
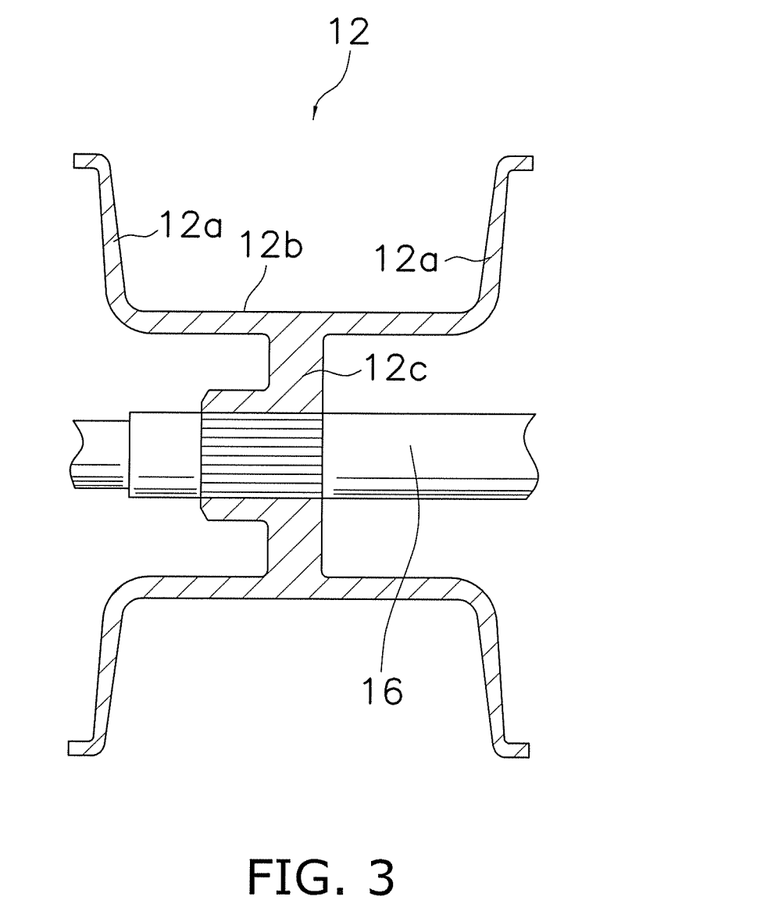
FIG. 3 is an enlarged cross-sectional view of a spool and a spool shaft in the dual-bearing reel.

As illustrated in an enlarged view of FIG. 3, the spool 12, which is formed by cutting aluminum alloy material, includes a bobbin trunk 12b, a pair of flanges 12a, and a boss 12c. The bobbin trunk 12b is a tubular member. The fishing line is wound onto the outer periphery of the bobbin trunk 12b. The flanges 12a are protruding radially outwards from the both axial ends of the bobbin trunk 12b. The boss 12c is formed in the inner periphery of the bobbin trunk 12b. The boss 12c allows a spool shaft 16 to be fixed in the inner periphery thereof. The bobbin trunk 12b, the flanges 12a, and the boss 12c are integrally formed by a member made of aluminum alloy. The spool 12 is non-rotatably fixed onto the spool shaft 16 by serration coupling for example. The method of fixing the spool 12 onto the spool shaft 16 is not limited to a fixation method using convex and concave parts such as serration coupling. For example, a variety of fixation methods (bonding, insert molding and etc.) can be alternatively used.

As illustrated in FIG. 2, the spool shaft 16 is a stick shaped member formed by cutting stainless alloy material. The spool shaft 16 extends outwards of the second side cover 6b while penetrating the second side plate 5b. The extended end of the spool shaft 16 is rotatably supported by a boss 6c formed on the second side cover 6b through a bearing 24a. On the other hand, the other end of the spool shaft 16 is rotatably supported within the centrifugal brake mechanism 23 through a bearing 24b. The bearings 24a and 24b are sealed ball bearings. The right end of a large diameter portion 16a of the spool shaft 16 is disposed in the position where the spool shaft 16 penetrates the second side plate 5b. An engaging pin 16b, forming a part of the clutch mechanism 13, is fixed in the right end of the large diameter portion 16a. The engaging pin 16b penetrates the large diameter portion 16a along its diameter. The both ends of the engaging pin 16b are radially protruding from the large diameter portion 16a.

Next, the surface structures of the spool 12 and the spool shaft 16 will be hereinafter explained.

The spool 12 includes an alumite layer 81 (see FIG. 7) on the surface thereof. The alumite layer 81 is herein formed by alumite processing. The spool shaft 16 is fixed in the inner periphery of the spool 12. The spool shaft 16 is made of stainless alloy and includes a Diamond-Like Carbon (DLC) layer 82 on the surface thereof (see FIGS. 5 to 7). The DLC layer 82 is formed by Plasma-Based Ion Deposition (PBID).

Next, the surface finishing process for the spool 12 and the spool shaft 16 will be hereinafter explained with reference to FIG. 4.

Figure 4:
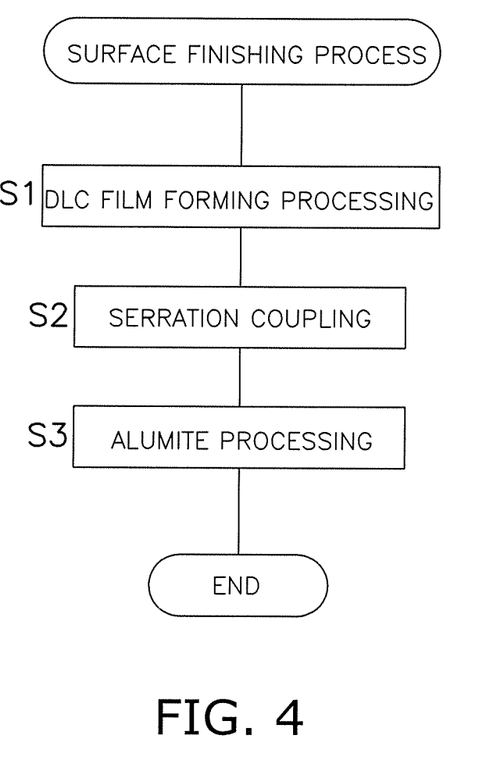
FIG. 4 is a flowchart representing a surface finishing process of the spool and the spool shaft.
Figure 5:
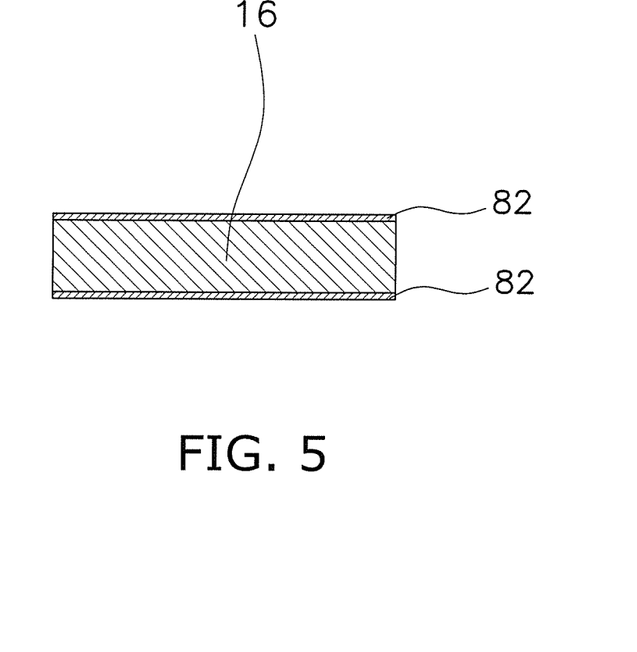
FIG. 5 is an enlarged schematic view of the spool shaft when Step S1 is executed in the surface finishing process.

First, in Step S1 of FIG. 4, the DLC layer 82 is formed on the surface of the spool shaft 16 (see FIG. 5). The DLC layer 82 is formed by PBID. It should be noted that PBID is a film forming processing to be executed together with Plasma-Based Ion Implantation (PBII). Specifically, the DLC layer 82 is formed on the surface of the spool shaft 16 through C-ion irradiation.

Figure 6:
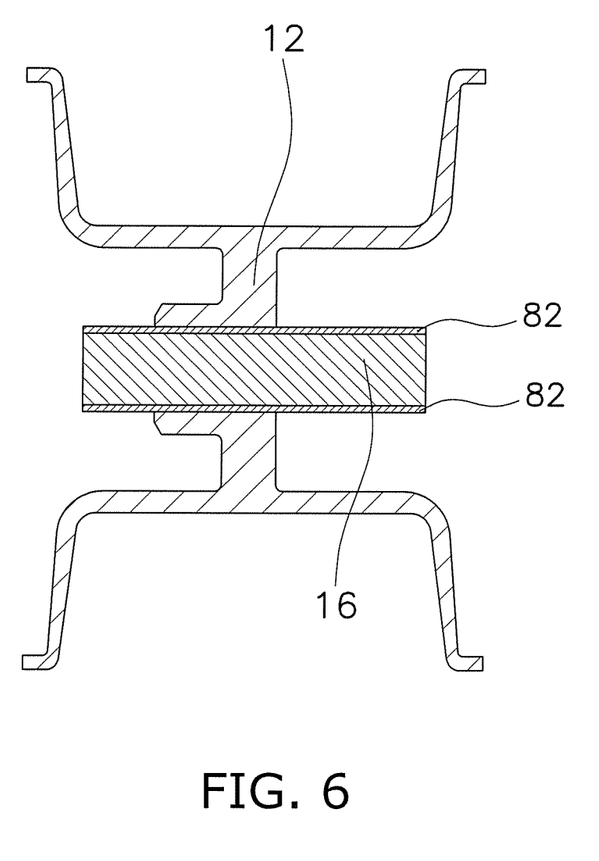
FIG. 6 is an enlarged schematic view of the spool and the spool shaft when Step S2 is executed in the surface finishing process.
Figure 7:
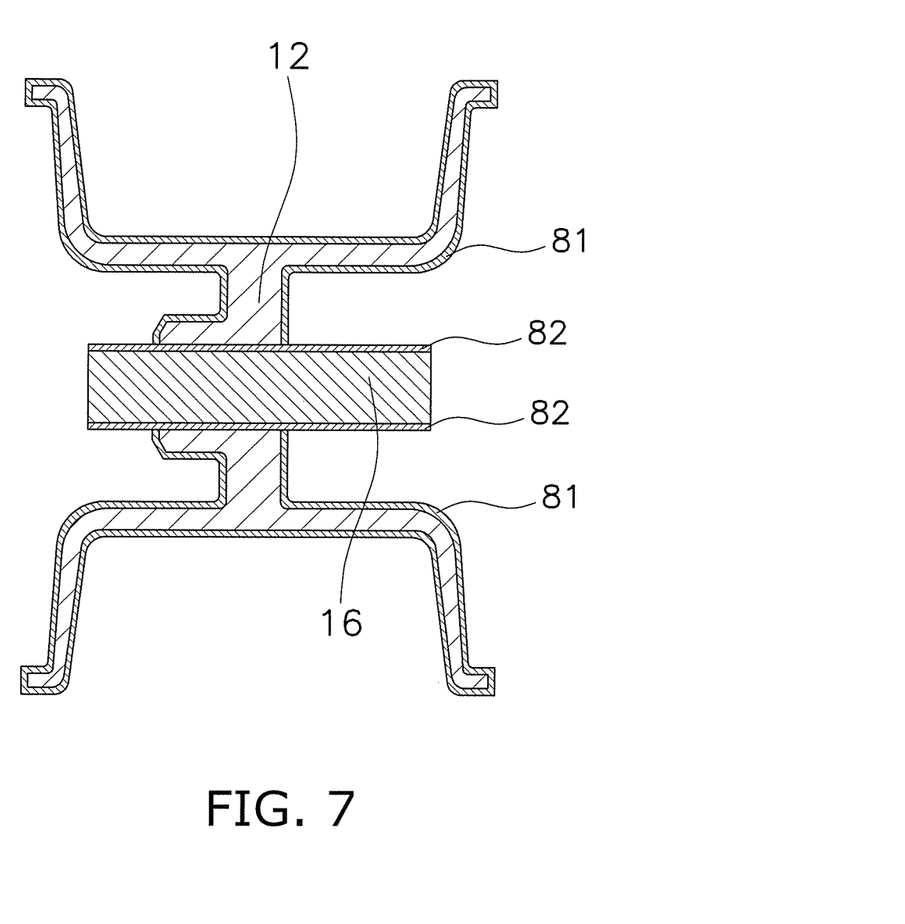
FIG. 7 is an enlarged schematic view of the spool and the spool shaft when Step S3 is executed in the surface finishing process.

Next in Step S2 of FIG. 4, the spool shaft 16 is non-rotatably fixed into the inner periphery of the spool 12 by serration coupling under the condition that the DLC layer 82 is formed on the surface of the spool shaft 16 (see FIG. 6). The spool shaft 16 is partially exposed to the outside, except a part fixed into the inner periphery of the spool 12. In other words, the both parts of the spool shaft 16, which laterally extend from the spool 12, are exposed to the outside.

Next, in Sep S3 of FIG. 4, the alumite layer 81 is formed on the surface of the spool 12 (see FIG. 7) after the spool shaft 16 is fixed into the spool 12. The alumite layer 81 is an oxide film formed by anodizing of aluminum alloy (i.e., alumite processing). The spool 12 made of aluminum alloy is soaked into electrolyte solution (e.g., sulfuric acid), and electrolysis is executed where the spool 12 is set as an anode. Accordingly, an oxide film is formed on the spool 12 due to oxygen to be generated on the anode. Specifically, the alumite layer 81 is formed by three processes of pre-treatment (e.g., degreasing, etching, neutralization or the like), anodizing (e.g., electrolytic treatment), and post-treatment (e.g., sealing). It should be noted that the spool 12 is soaked into the electrolyte solution together with the spool shaft 16 fixed thereto in anodizing. Therefore, the spool shaft 16 is herein partially exposed to the outside and is thus exposed to the electrolyte solution, except a part fixed into the inner periphery of the spool 12. In other words, the both parts of the spool shaft 16, which laterally extend from the spool 12, are exposed to the electrolyte solution. However, the DLC layer 82 is formed on the surface of the spool shaft 16 made of stainless alloy. Therefore, it is not required to mask the spool shaft 16 made of stainless alloy.

Through the aforementioned process, the DLC layer 82 is formed on the surface of the spool shaft 16, while the alumite layer 81 is formed on the surface of the spool 12.

As illustrated in FIG. 2, the gear mechanism 18 includes a handle shaft 30, a main gear 31, and a pinion gear 32. The main gear 31 is fixed onto the handle shaft 30. The pinion gear 32 is a tubular gear meshed with the main gear 31. To reduce the height of the thumb rest 8, the vertical position of the handle shaft 30 of the gear mechanism 18 is set to be lower than a conventional position. Therefore, the bottom parts of the second side plate 5b and the second side cover 6b, which accommodate the gear mechanism 18, are positioned lower than the bottom parts of the first side plate 5a and the first side cover 6a.

As illustrated in FIG. 2, the pinion gear 32 is a tubular member allowing the spool shaft 16 to penetrate the inner periphery thereof. The pinion gear 32 inwardly extends from the outside of the second side plate 5b. In other words, the pinion gear 32 is attached onto the spool shaft 16 while being axially movable. Further, the left end of the pinion gear 32 (see FIG. 2) is supported by the second side plate 5b through a bearing 43 while being rotatable and axially movable. As illustrated in FIG. 2, the bearing 43 is also a sealed ball bearing.

The pinion gear 32 includes a teeth portion 32a, an engaged portion 32b and a narrowed portion 32c. The teeth portion 32a is formed on the outer periphery of the right end of the pinion gear 32 (see FIG. 2). The teeth portion 32a is meshed with the main gear 31. The engaged portion 32b is formed on the left end of the pinion gear 32 (see FIG. 2). The narrowed portion 32c is formed axially between the teeth portion 32a and the engaged portion 32b. More specifically, the engaged portion 32b is a groove recessed on an end surface of the pinion gear 32 along its diameter. The engaging pin 16b, which penetrates through and fixed to the spool shaft 16, is engaged with the engaged portion 32b. When the pinion gear 32 is herein moved outwards, the engaging pin 16b fixed to the spool shaft 16 is disengaged from the engaged portion 32b. Under the condition, rotational force of the handle shaft 30 is prevented from being transmitted to the spool 12. The engaged portion 32b and the engaging pin 16b form the clutch mechanism 13. When the engaging pin 16b is engaged with the engaged portion 32b, in contrast, torque is directly transmitted to the spool shaft 16 from the pinion gear 32 having a diameter greater than that of the spool shaft 16. Therefore, torsional deformation can be further inhibited and torque transmission efficiency can be enhanced.

As illustrated in FIG. 2, the clutch lever 17 is disposed behind the spool 12 while being disposed in the rear part of a space between the pair of first and second side plates 5a and 5b.

As illustrated in FIG. 2, the clutch engaging/disengaging mechanism 19 includes a clutch yoke 40. The clutch yoke 40 is disposed on the outer peripheral side of the spool shaft 16. The clutch yoke 40 is supported by two pins 41 (only one of them is illustrated in the figure) while being movable in parallel to the axis of the spool shaft 16. Further, the clutch yoke 40 includes an engaging portion 40a in the center part thereof. The engaging portion 40a is engaged with the narrowed portion 32c of the pinion gear 32. Yet further, two springs 42 are disposed on the outer peripheries of the pins 41 supporting the clutch yoke 40. The springs 42 constantly urge the clutch yoke 40 to the inward while being interposed between the clutch yoke 40 and the second side cover 6b.

With the structure, the pinion gear 32 is normally positioned in an inward clutch engaged position. Under the condition, the engaging pin 16b fixed to the spool shaft 16 is engaged with the engaged portion 32b, and a clutch-on state is thereby produced. When the pinion gear 32 is moved outwards by the clutch yoke 40, in contrast, the engaging pin 16b is disengaged from the engaged portion 32b and a clutch-off state is thereby produced.

The drag mechanism 21 includes a friction plate 45 and a pressure plate 46. The friction plate 45 is pressed onto the main gear 31. The pressure plate 46 is configured to press the friction plate 45 onto the main gear 31 with a predetermined force by a rotational operation of the star drag 3.

The casting control mechanism 22 includes a plurality of friction plates 51 and a brake cap 52. The friction plates 51 interpose the spool shaft 16 therebetween while holding the both ends of the spool shaft 16. The brake cap 52 is configured to regulate pressure of the friction plates 51 for interposing and holding the spool shaft 16 therebetween. The left-side friction plate 51 is attached to the inside of a brake case 65.

As illustrated in FIG. 2, the centrifugal brake mechanism 23 includes a brake member 68, a rotation member 66, and six moving members 67. The brake member 68 is fixed to the brake case 65. The rotation member 66 is fixed onto the spool shaft 16. The rotation member 66 is disposed on an inner peripheral side of the brake member 68 while being concentric to the brake member 68. The moving members 67 are attached to the rotation member 66 while being radially movable.

According to the dual-bearing reel thus structured, the DLC layer 82 is formed on the surface of the spool shaft 16 made of stainless alloy. Therefore, abrasion resistance of the spool shaft 16 can be enhanced and frictional resistance can be reduced between the outer periphery of the spool shaft 16 and the inner peripheries of the bearings 24a and 24b. Further, the outer periphery of the spool shaft 16 is not required to be masked in alumite processing for the surface of the spool 12. Therefore, the surface fishing process for the spool 12 can be simplified.

Other Exemplary Embodiments (a) The spool 12 and the spool shaft 16 for the dual-bearing reel have been exemplified as fishing components of the present invention. However, the application of the present invention is not limited to the above, and can be applied to a spool and a spool shaft of a spinning reel.

(b) The aforementioned exemplary embodiment has been explained by exemplifying the dual-bearing reel including the reel unit 1 of a non-round type. However, the present invention can be applied to a dual-bearing reel including the reel unit 1 of a round type.

(c) In the aforementioned exemplary embodiment, the DLC layer 82 is formed by Plasma-Based Ion Deposition (PBID). However, the DLC layer 82 can be formed by any other suitable film forming processing.

(d) In the aforementioned exemplary embodiment, the spool 12 is made of aluminum alloy. However, material of the spool 12 is not limited to the above. For example, the spool 12 can be made of synthetic alloy or light metal (e.g., magnesium alloy) having a specific gravity less than that of stainless alloy.

When the spool 12 is made of magnesium alloy, this exemplary embodiment is basically the same as the aforementioned exemplary embodiment except that magnesium alloy is herein used as the material of the spool 12 instead of aluminum alloy and anodizing is herein executed instead of alumite processing. Therefore, only differences will be hereinafter explained without explaining similarity.

In this case, the DLC layer 82 having insulation properties is formed on the surface of the spool shaft 16 made of stainless alloy. When the stainless-alloy spool shaft 16 is herein fixed to the spool 12 made of magnesium alloy, the magnesium-alloy spool 12 makes contact with the DLC layer 82 without directly making contact with the stainless-alloy spool shaft 16. Therefore, galvanic corrosion of the magnesium-alloy spool 12 can be prevented.

Further, a component made of aluminum alloy is not required to be interposed between the spool 12 and the spool shaft 16 as seen in the well-known structure. Therefore, it is possible to reduce manufacturing cost and prevent galvanic corrosion of the spool 12 made of magnesium alloy. Further, a sleeve is not herein required to be interposed between the spool 12 and the spool shaft 16 as seen in the well-known structure. Therefore, it is possible to reduce a relative positional error between the spool 12 and the spool shaft 16 as much as possible. This results in less run-out of the outer periphery of the spool 12 with respect to the spool shaft 16.

Further, herein suppose a situation that anodizing is executed after the DLC layer having insulation properties is formed on the surface of the spool shaft 16 made of stainless alloy and the spool shaft 16 is then attached to the spool 12 made of magnesium alloy. In this case, the stainless-alloy spool shaft 16 is exposed to the outside. However, the stainless-alloy spool shaft 16 is not required to be masked due to the insulating DLC layer 82 formed on the surface of thereof. Further, it is not required to use a spool shaft made of expensive titanium alloy, that is difficult to be processed, as the spool shaft 16. Therefore, manufacturing cost can be further reduced.

Yet further, abrasion resistance of the spool shaft 16 can be herein enhanced, and simultaneously, frictional resistance of the spool shaft 16 can be reduced due to the insulating DLC layer 82 formed on the surface of the spool shaft 16 made of stainless alloy. Therefore, rotational performance of the spool shaft 16 can be highly maintained.

When the spool 12 is made of synthetic resin, on the other hand, this exemplary embodiment is basically the same as the aforementioned exemplary embodiment except the surface finishing process for and the surface structures of the spool 12 and the spool shaft 16 as well as the fact that synthetic resin is herein used as the material of the spool 12 instead of aluminum alloy. Therefore, only differences will be hereinafter explained without explaining similarity.

The surface structures of the spool 12 and the spool shaft 16 in forming the synthetic-resin spool 12 will be hereinafter explained with reference to FIGS. 9 and 10.

Figure 9:
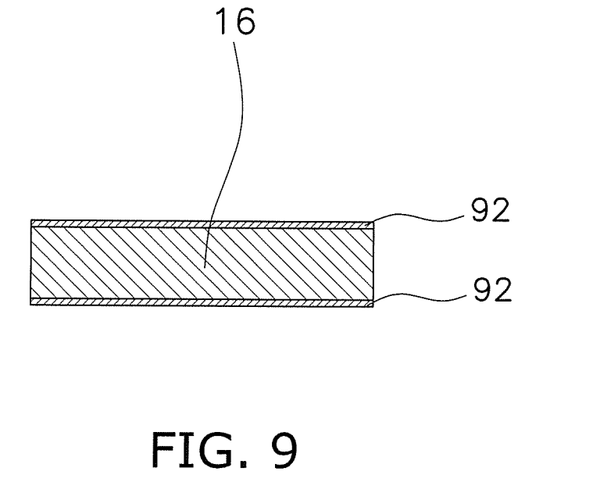
FIG. 9 is an enlarged schematic view of the spool shaft when Step S11 is executed in the surface finishing process according to another exemplary embodiment.
Figure 10:
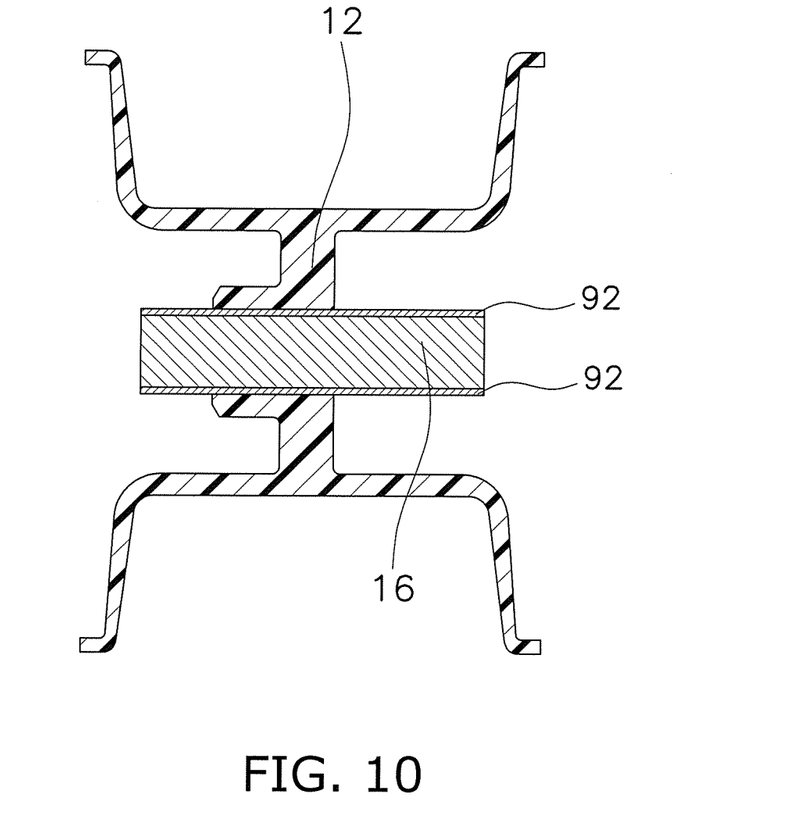
FIG. 10 is an enlarged schematic view of the spool and the spool shaft when Step S12 is executed in the surface finishing process according to another exemplary embodiment.

As illustrated in FIG. 10, the spool 12 is formed by molding synthetic resin and synthetic resin is exposed on the surface of the spool 12. The spool shaft 16 is fixed to the inner periphery of the spool 12. The spool shaft 16 is made of stainless alloy and includes a Diamond-Like Carbon (DLC) layer 92 on the surface thereof (see FIGS. 9 and 10). The DLC layer 92 is formed by Plasma-Based Ion Deposition (PBID).

Figure 8:
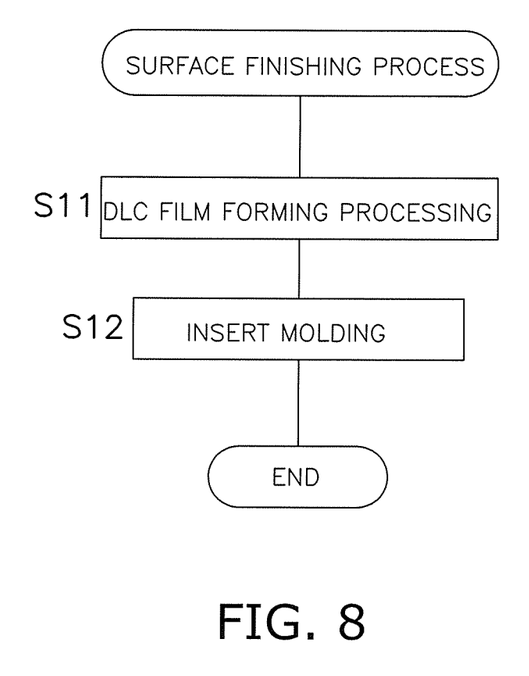
FIG. 8 is a flowchart representing a surface finishing process for the spool and the spool shaft according to another exemplary embodiment.

FIG. 8 represents surface finishing process of the spool 12 and the spool shaft 16 in forming the synthetic-resin spool 12.

First in Step S11 of FIG. 8, the DLC layer 92 is formed on the surface of the spool shaft 16 (see FIG. 9). The DLC layer 92 is formed by Plasma-Based Ion Deposition (PBID). PBID is a film forming processing to be executed together with PBII (Plasma-Based Ion Implantation). Specifically, the DLC layer 92 is formed on the surface of the spool shaft 16 through C-ion irradiation.

Next in Step S12 of FIG. 8, the spool shaft 16 including the DLC layer 92 on the surface thereof is set in a die and the spool 12 is formed by insert molding. Accordingly, the spool shaft 16 is fixed to the inner periphery of the spool 12 (see FIG. 10). It should be noted that the spool shaft 16 is partially exposed to the outside, except a part fixed into the inner periphery of the spool 12. In other words, the both parts of the spool shaft 16, which laterally extend from the spool 12, are exposed to the outside.

Through the aforementioned process, the DLC layer 92 is formed on the surface of the spool shaft 16 while synthetic resin is exposed on the surface of the spool 12.

In this case, the spool 12 made of synthetic resin can be formed in lightweight construction. Further, the spool 12 can be easily formed by molding.

(e) In the aforementioned exemplary embodiment, the spool shaft 16 is made of stainless alloy. However, material of the spool shaft 16 is not limited to the above. For example, the spool shaft 16 can be made of titanium alloy or aluminum alloy. It should be noted that aluminum alloy has less adhesiveness to the DLC layer 82. In forming the aluminum-alloy spool shaft 16, the DLC layer 82 is desirably formed on a surface of an anodic oxide film layer or a plated layer after the anodic oxide film layer or the plated layer is formed on the surface of the spool shaft 16.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. A fishing reel for winding and releasing a fishing line, comprising:
    a tubular spool being configured to wind the fishing line onto an outer periphery thereof;
    a spool shaft made of metal, the spool shaft being attached to an inner periphery of the spool; and a Diamond Like Carbon (DLC) layer being formed on a surface layer side of the spool shaft.

2. A fishing reel comprising:
a tubular spool being configured to wind the fishing line onto an outer periphery thereof;
a spool shaft made of metal, the spool shaft being attached to an inner periphery of the spool; and
a Diamond Like Carbon (DLC) layer being formed on a surface layer side of the spool shaft,
the spool being made of a material having a specific gravity less than a specific gravity of the metal used for the spool shaft.

3. The fishing reel according to claim 2, wherein the spool is made of synthetic resin.

4. The fishing reel according to claim 2, wherein the spool is made of magnesium alloy.

5. The fishing reel according to claim 4, wherein
the fishing reel is a dual-bearing reel,
the spool shaft is made of stainless alloy,
the spool shaft is fixed to the inner periphery of the spool in a directly contactable state, and
the DLC layer has insulation properties.

6. The fishing reel according to claim 5, further comprising:
an anodic oxide film layer formed on the surface layer side of the spool shaft.

7. The fishing reel according to claim 6, wherein
the anodic oxide film layer is formed by anodizing after the spool shaft is fixed to the spool.

8. The fishing reel according to claim 2, wherein
the spool is made of aluminum alloy.

9. The fishing reel according to claim 2, wherein
the DLC layer is formed by Plasma-Based Ion Deposition (PBID).

10. A spool of a fishing reel for winding and releasing a fishing line, comprising:
a tubular bobbin trunk being configured to wind the fishing line onto an outer periphery thereof;
a spool shaft made of metal, the spool shaft being attached to an inner periphery of the bobbin trunk; and
a Diamond Like Carbon (DLC) layer being formed on a surface layer side of the spool shaft.

11. A spool shaft of a fishing reel made of metal, and being attached to an inner periphery of a spool, comprising:
a Diamond Like Carbon (DLC) layer being formed on a surface layer side of the spool shaft.

* * * * *